US009928428B2

(12) United States Patent
Lee

(10) Patent No.: US 9,928,428 B2
(45) Date of Patent: Mar. 27, 2018

(54) APPARATUS FOR DIAGNOSING WHETHER TARGET RECOGNITION FUNCTION USING CAMERA OF VEHICLE IS NORMALLY OPERATED, AND DIAGNOSING METHOD USING THE SAME

(71) Applicant: HYUNDAI MOBIS Co., Ltd., Yongin-si, Gyeonggi-do (KR)

(72) Inventor: Hyuk Lee, Yongin-si (KR)

(73) Assignee: HYUNDAI MOBIS CO., LTD., Yongin-si, Gyeonggi-do (KR)

( * ) Notice: Subject to any disclaimer, the term of this patent is extended or adjusted under 35 U.S.C. 154(b) by 51 days.

(21) Appl. No.: 15/077,058

(22) Filed: Mar. 22, 2016

(65) Prior Publication Data
US 2016/0283802 A1 Sep. 29, 2016

(30) Foreign Application Priority Data

Mar. 25, 2015 (KR) ........................ 10-2015-0041462

(51) Int. Cl.
G06K 9/00 (2006.01)
(52) U.S. Cl.
CPC ..... G06K 9/00798 (2013.01); G06K 9/00993 (2013.01)
(58) Field of Classification Search
None
See application file for complete search history.

(56) References Cited

U.S. PATENT DOCUMENTS

| 9,467,687 B2* | 10/2016 | Takemura | ............ H04N 17/002 |
| 9,530,210 B2* | 12/2016 | Matono | .................. G08G 1/166 |
| 2007/0092134 A1* | 4/2007 | Fukui | ................. G06K 9/00234 |
| | | | 382/160 |
| 2011/0187582 A1* | 8/2011 | Tsunekawa | ............ G08G 1/166 |
| | | | 342/107 |
| 2015/0036886 A1* | 2/2015 | Matono | .................. G08G 1/166 |
| | | | 382/106 |
| 2016/0283802 A1* | 9/2016 | Lee | ..................... G06K 9/00798 |

FOREIGN PATENT DOCUMENTS

WO    WO2013132947    * 9/2013

* cited by examiner

Primary Examiner — Tahmina Ansari
(74) Attorney, Agent, or Firm — Paratus Law Group, PLLC

(57) ABSTRACT

An apparatus for diagnosing a failure of recognition logic, which recognizes a target in an image obtained by a vehicle, including: an image frame including coordinates of a reference characteristic point of a set target; a camera sensor photographing a front side of the vehicle and outputting an image of the front side; a recognition logic unit calculating coordinates of a characteristic point in the image frame and outputting coordinates of a recognized characteristic point; an image frame compulsory input unit applying the image frame to the recognition logic unit at a predetermined period instead of the image of the front side of the vehicle; and a normal operation determining unit determining whether the recognition logic unit is normally operated according to whether the coordinates of the reference characteristic point are matched with the coordinates of the recognized characteristic point during the compulsory input of the image frame.

6 Claims, 5 Drawing Sheets

APPARATUS FOR DIAGNOSING WHETHER TARGET RECOGNITION FUNCTION USING CAMERA OF VEHICLE IS NORMALLY OPERATED, AND DIAGNOSING METHOD USING THE SAME

CROSS-REFERENCE TO RELATED APPLICATIONS

The present application claims priority to Korean Patent Application Number 10-2015-0041462 filed Mar. 25, 2015, the entire contents of which application is incorporated herein for all purposes by this reference.

TECHNICAL FIELD

The present invention relates to an apparatus and a method of diagnosing a recognition failure, and more particularly, to an apparatus and a method of diagnosing a recognition failure, which diagnose a failure of recognition logic which recognizes a target in an image obtained by a vehicle.

BACKGROUND

Recently, a technology, in which a camera sensor is installed in a vehicle, a specific target is recognized in an image obtained by the camera sensor, and a device of the vehicle is controlled, has been applied to most of the vehicles.

However, when an error is generated during a process of recognizing the specific target in the image, an incorrect control may be performed and the incorrect control may be directly connected to safety of a driver, thereby causing a dangerous situation for the driver. Further, according to the reinforcement of the regulation of minimizing an error in the ISO 26262, a technology for securing robustness of a system, that is, an accurate operation of the system is required.

Accordingly, researches on various technologies for diagnosing whether logic itself recognizing a specific target is normally driven have been conducted.

SUMMARY

The present invention has been made in an effort to provide an apparatus for diagnosing a recognition failure, which diagnoses a failure of recognizing logic recognizing a target in an image obtained by a vehicle.

Objects of the present invention are not limited to the objects described above, and other objects that are not described will be clearly understood by a person skilled in the art from the description below.

An exemplary embodiment of the present invention provides an apparatus for diagnosing a recognition failure, which determines whether a target recognition by a camera sensor installed in a vehicle is normally operated, the apparatus including: an image frame which includes coordinates of a reference characteristic point of a set target; a camera sensor which photographs a front side of the vehicle and outputs an image of the front side of the vehicle; a recognition logic unit which recognizes a target in the image of the front side of the vehicle, calculates coordinates of a characteristic point, and outputs coordinates of a recognized characteristic point; an image frame compulsory input unit which applies the image frame to the recognition logic unit at a predetermined period instead of the image of the front side of the vehicle; and a normal operation determining unit which determines whether the recognition logic unit is normally operated according to whether the coordinates of the reference characteristic point are matched with the coordinates of the recognized characteristic point during the compulsory input of the image frame.

Another exemplary embodiment of the present invention provides a method of diagnosing a recognition failure, which determines whether a target recognition by a camera sensor installed in a vehicle is normally operated, the method including: photographing, by a camera sensor, a front side of the vehicle and outputting an image of the front side of the vehicle; recognizing a target in the image of the front side of the vehicle; applying an image frame including coordinates of one or more reference characteristic points to the recognizing of the target at a predetermined period instead of the image of the front side of the vehicle; recognizing a target in the image frame, calculating coordinates of a characteristic point, and outputting coordinates of a recognized characteristic point; and determining whether the outputting of the coordinates of the recognized characteristic point is normally operated according to whether the coordinates of the reference characteristic point are matched with the coordinates of the recognized characteristic point during a compulsory input of the set image frame.

According to the apparatus and the method for diagnosing a recognition failure, an image frame, which serves as a reference, is embedded in the apparatus itself, so that it is possible to determine whether recognition logic is normal regardless of outside weather or situation, and it is possible to rapidly process an entire system by varying the number of characteristic points compared according to a load rate of a processor.

The effects of the present invention are not limited to the aforementioned effects, and other effects, which are not mentioned above, will be clearly understood by those skilled in the art from the claims.

DETAILED DESCRIPTION

Figure 1:
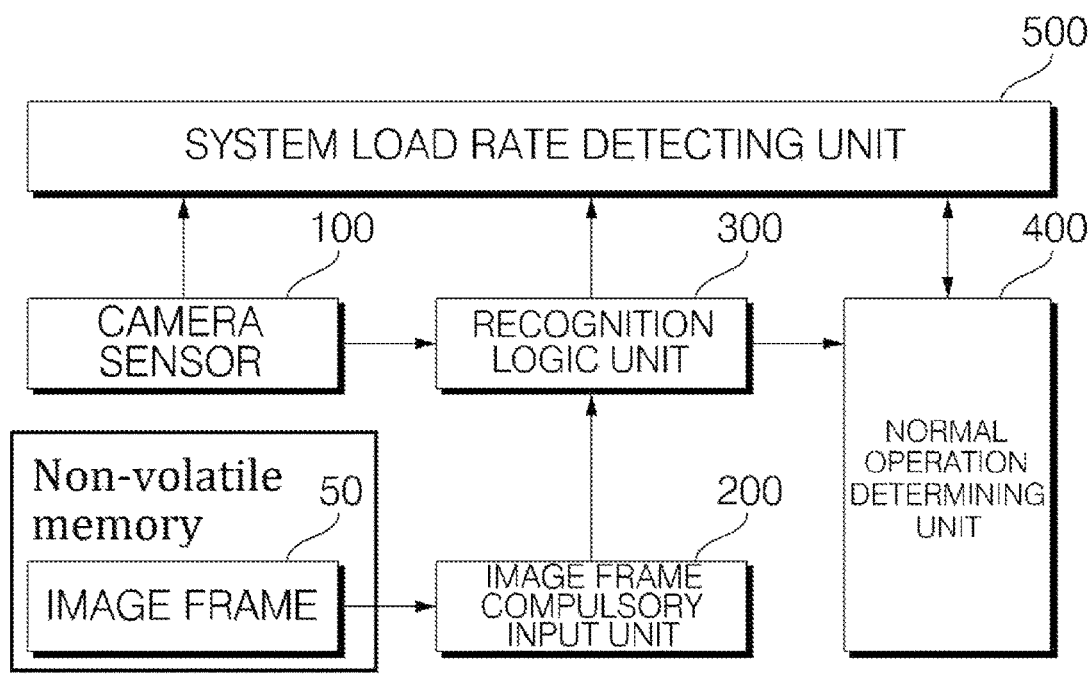
FIG. 1 is a configuration diagram illustrating a configuration of an apparatus for diagnosing a recognition failure according to an exemplary embodiment of the present invention.

Various advantages and features of the present disclosure and methods accomplishing thereof will become apparent from the following detailed description of exemplary embodiments with reference to the accompanying drawings. However, the present invention is not limited to the exemplary embodiments set forth below, and may be embodied in various other forms. The present exemplary embodiments are for rendering the description of the present invention complete and are set forth to provide a complete understanding of the scope of the invention to a person with ordinary skill in the technical field to which the present invention pertains, and the present invention will only be defined by the scope of the claims. Like reference numerals indicate like elements throughout the specification.

Hereinafter, the present invention will be described with reference to the drawings for describing an apparatus for diagnosing a recognition failure according to exemplary embodiments of the present invention. The apparatus for diagnosing a recognition failure according to the exemplary embodiment of the present invention may be operated at a moment where a vehicle starts.

FIG. 1 is a configuration diagram illustrating a configuration of the apparatus for diagnosing a recognition failure according to the exemplary embodiment of the present invention. Referring to FIG. 1, the apparatus for diagnosing a recognition failure according to the exemplary embodiment of the present invention includes an image frame 50, a camera sensor 100, an image frame compulsory input unit 200, a recognition logic unit 300, a normal operation determining unit 400, and a system load rate detecting unit 500.

The image frame 50 includes coordinates of a reference characteristic point of a set target. The image frame 50 includes coordinates of one or more reference characteristic points. The image frame 50 may be stored in a non-volatile memory. As long as the image frame 50 recognizes a characteristic point in an image, any kind of image is available. The image frame 50 may include a lane, another vehicle, a light source, a road sign, a pedestrian, and the like, which may be characteristic points. In the present exemplary embodiment, the image frame 50 includes a lane as a recognition target.

The image frame 50 becomes a reference image frame for determining whether the recognition logic unit 300 is normally operated. That is, the image frame 50 includes coordinates of a reference characteristic point, which is coordinate information on a characteristic point.

The camera sensor 100 photographs a front side of the vehicle and outputs an image of the front side of the vehicle.

The image frame compulsory input unit 200 applies the image frame 50 to the recognition logic unit 300 at a predetermined period instead of the image of the front side of the vehicle. The image frame 50 may be stored in a non-volatile memory as one frame of an image conforming to various requirements.

The image frame compulsory input unit 200 compares reference coordinates stored in the image frame 50 with coordinates of a recognized characteristic point by an operation of the recognition logic unit 300 by using the image frame 50, which is set for determining whether the recognition logic unit 300 is normally operated in the middle of the operation of the recognition logic unit 300, as a source.

While the recognition logic unit 300 recognizes a lane in the image of the front side of the vehicle, the image frame compulsory input unit 200 applies the image frame 50 to the recognition logic unit 300 every predetermined period. In this case, the recognition logic unit 300 recognizes a lane by using the image frame 50 as the source, outputs coordinates of a characteristic point in the recognized lane, and outputs coordinates of a reference characteristic point.

The recognition logic unit 300 recognizes a target in the image of the front side of the vehicle during the travelling. The recognition logic unit 300 outputs coordinates of a recognized characteristic point by calculating the coordinates of the characteristic point in the image frame 50. In the exemplary embodiment of the present invention, the recognition logic unit 300 recognizes a lane. The recognition logic unit 300 may recognize a lane by using a Kalman filter, a Top-hat filter, and the like. The recognition logic unit 300 outputs the coordinates of the recognized characteristic point when the image frame compulsory input unit 200 applies the image frame to the recognition logic unit 300.

The recognition logic unit 300 recognizes one or more characteristic points in the recognized lane. In the present exemplary embodiment, the recognition logic unit 300 recognizes six characteristic points in one line of the lane.

When the recognition logic unit 300 is determined to have a failure such that there is a probability in that the vehicle deviates from the lane or collides, the recognition logic unit 300 receives dynamics information about the vehicle in order to control an alarm or steering through a controller area network (CAN) input.

The normal operation determining unit 400 determines whether the recognition logic unit 300 is normally operated according to whether the coordinates of the reference characteristic point are matched with the coordinates of the recognized characteristic point during the compulsory input of the image frame. The normal operation determining unit 400 recognizes the coordinates of the recognized characteristic points having the same number as the number of coordinates of the reference characteristic points included in the image frame and determines whether the coordinates of the recognized characteristic points are matched with the coordinates of the reference characteristic points included in the image frame 50, respectively.

When a load rate of a processor detected by the system load rate detecting unit 500 is equal to or less than a reference load rate, the normal operation determining unit 400 considers all of the reference characteristic points included in the image frame 50. In the present exemplary embodiment, the normal operation determining unit 400 compares six reference characteristic points with six recognized characteristic points recognized by the recognition logic unit 300. The reference load rate may be set to a load rate, at which a burden is applied to the system, and may be set to 80%.

When the load rate of the processor detected by the system load rate detecting unit 500 is larger than the reference load rate, the normal operation determining unit 400 considers only some of the one or more reference characteristic points included in the image frame 50. When the reference load rate is equal to or larger than 80%, the normal operation determining unit 400 does not determine all of the six characteristic points per one line of the land and determines only four characteristic points per one line of the lane. The recognition failure diagnosing system, which is the present invention, may prevent a performance speed of the recognition logic unit 300 itself from being decreased by controlling the operation of the normal operation determining unit 400 according to the load rate of the processor detected by the system load rate detecting unit 500.

The recognition logic unit 300 and the normal operation determining unit 400 are simultaneously operated according to a predetermined period. When the image frame compulsory input unit 200 inputs the image frame 50 to the recognition logic unit 300 at the predetermined period, the recognition logic unit 300 is operated based on the image frame 50 as a target, and in this case, the normal operation determining unit 400 simultaneously determines whether the recognition logic unit 300 is normally operated by comparing the reference characteristic point with the recognized characteristic point.

The system load rate detecting unit 500 detects a load rate of the processor when the recognition logic unit 300 recognizes the target. The system load rate detecting unit 500 may detect a load rate of the processor by detecting an occupation rate of the processor in which the recognition logic unit 300 is operated. For example, the system load rate detecting unit 500 detects a load rate of the processor by checking an occupation rate of the processor provided by the AUTOSAR system.

When the system load rate detecting unit 500 determines that the recognition logic unit 300 has a failure, the system load rate detecting unit 500 may output an alarm and a control signal of the vehicle through the CAN by using the dynamics information about the vehicle.

Figure 2:
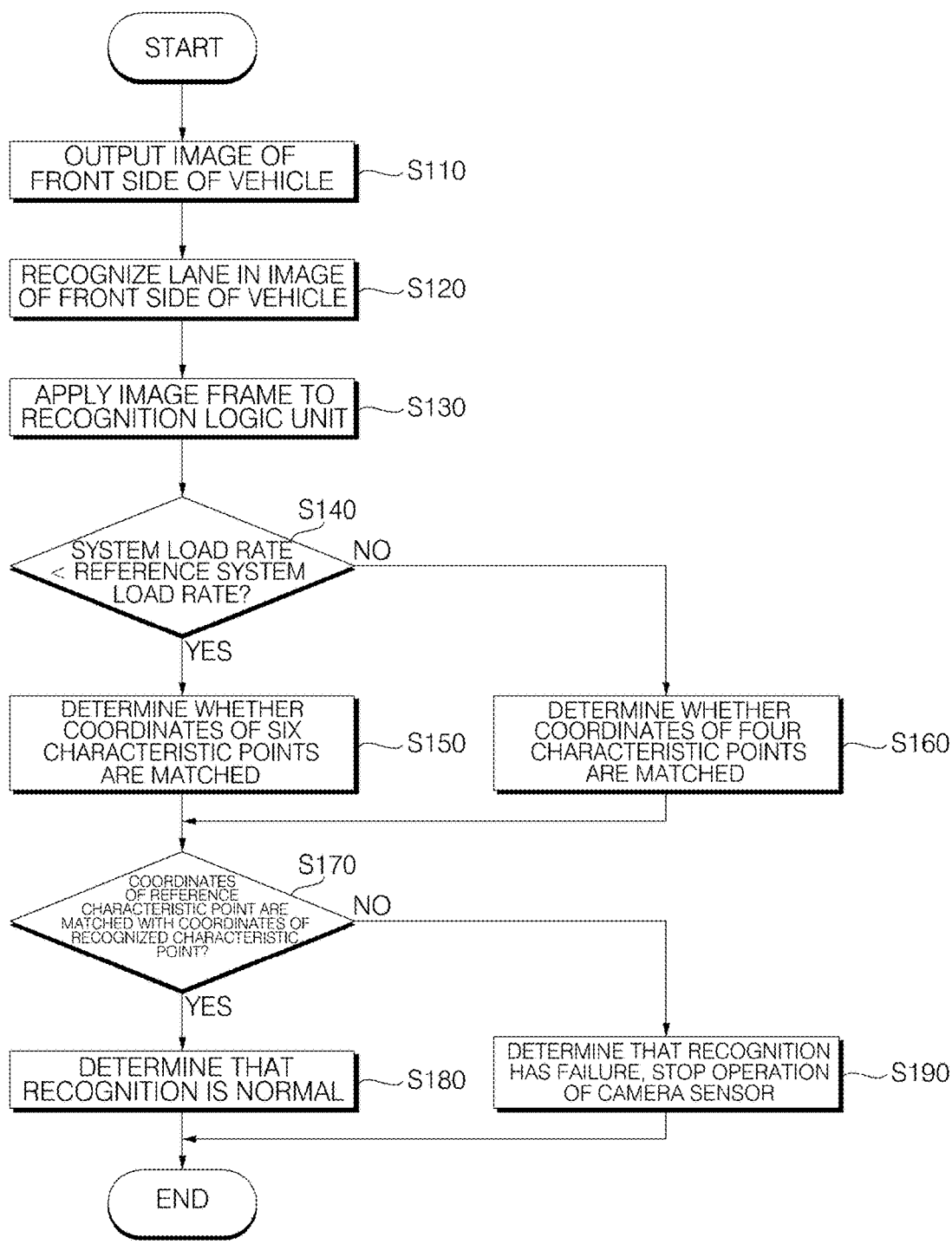
FIG. 2 is a flowchart illustrating a flow of a method of diagnosing a recognition failure by the configuration illustrated in FIG. 1.

FIG. 2 is a flowchart illustrating a flow of a method of diagnosing a recognition failure according to the present invention.

Referring to FIG. 2, first, the camera sensor 100 photographs a front side of the vehicle and outputs an image of the front side of the vehicle (S110). The camera sensor 100 may receive the image of the front side of the vehicle at a period of 15 Hz, and transmit the received image of the front side of the vehicle to the recognition logic unit 300 in a digital form.

The recognition logic unit 300 recognizes a target in the image of the front side of the vehicle, calculates coordinates of a characteristic point, and outputs coordinates of a recognized characteristic point (S120). In the present exemplary embodiment, the recognition logic unit 300 recognizes a lane as a target. The recognition logic unit 300 recognizes the lane, calculates coordinates of a characteristic point of the lane, and outputs coordinates of a recognized characteristic point (S120).

The image frame compulsory input unit 200 applies the image frame 50 to the recognition logic unit 300 at a predetermined period instead of the image of the front side of the vehicle (S130). The image frame compulsory input unit 200 may apply the image frame 50 to the recognition logic unit 300 at a period of one second. The system load rate detecting unit 500 detects a load rate of the processor when the recognition logic unit 300 (S140) recognizes the target. A method of detecting a load rate of the processor by the system load rate detecting unit 500 has been already described with reference to FIG. 1.

When the load rate of the processor detected by the system load rate detecting unit 500 is less than a reference load rate, the normal operation determining unit 400 according to the exemplary embodiment determines whether coordinates of the six characteristic points are matched (S150).

When the load rate of the processor detected by the system load rate detecting unit 500 is larger than the reference load rate, the normal operation determining unit 400 determines whether some of one or more reference characteristic points included in the image frame, particularly, coordinates of the four characteristic points among the coordinates of coordinates of the six characteristic points, are matched (S160).

The normal operation determining unit 400 determines whether the recognition logic unit 300 is normally operated according to whether the coordinates of the reference characteristic point are matched with the coordinates of the recognized characteristic point during the compulsory input of the image frame 50 (S170).

When the coordinates of the reference characteristic point are matched with the coordinates of the recognized characteristic point, the normal operation determining unit 400 determines that the recognition logic unit 300 provided in the vehicle is normally operated (S180).

When the coordinates of the reference characteristic point are not matched with the coordinates of the recognized characteristic point, the normal operation determining unit 400 determines that the recognition logic unit 300 has a failure and stops the operation of the camera sensor 100 (S190). When the normal operation determining unit 400 determines that the recognition logic unit 300 has the failure, the normal operation determining unit 400 may transmit the failure state to the AUTOSAR system.

Figure 3:
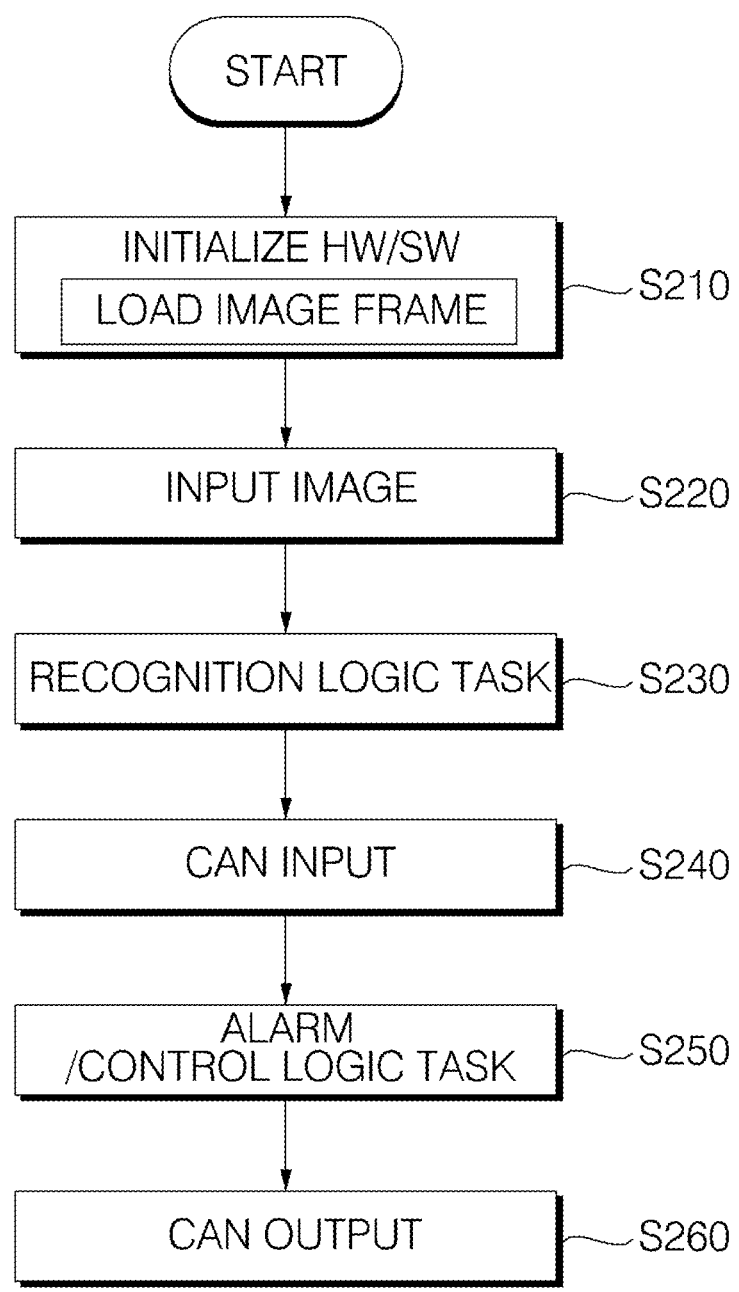
FIG. 3 is a flowchart illustrating a flow of recognition failure diagnosing software according to the present invention.

FIG. 3 is a flowchart illustrating a flow of recognition failure diagnosing software according to the present invention. Referring to FIG. 3, the software of the apparatus for diagnosing a recognition failure reads the image frame 50 stored in a non-volatile memory in an initialization routine (S210). In this case, the image frame 50 may consider various test cases for various tests, and considers a lane in the present exemplary embodiment.

The loaded image frame 50 is compulsorily applied to an image photographed by the camera. The photographed image, to which the image frame is applied, is input to a recognition logic task (S220).

The recognition logic task performs a recognition algorithm and recognition diagnosis logic based on the input image (S230). The recognition algorithm performs recognition on the image frame 50, and derives a recognition result in a form of a characteristic point. The recognition diagnosis logic determines a normal and failure state of the recognition algorithm.

The software outputs a result of the recognition algorithm and a result of the recognition diagnosis logic to an alarm and control logic task, and inputs dynamics information to the alarm and control logic task from the vehicle through a CAN input (S240).

When the alarm and control logic task determines that the recognition logic is in the failure state, the software may determine the failure state through the alarm and control logic when a failure, such as a CAN input failure, a recognition logic failure, and an internal failure, is generated (S250).

When it is determined that the recognition logic is in the failure state, the software may output an alarm and a control signal to the CAN (S260).

Figure 4:
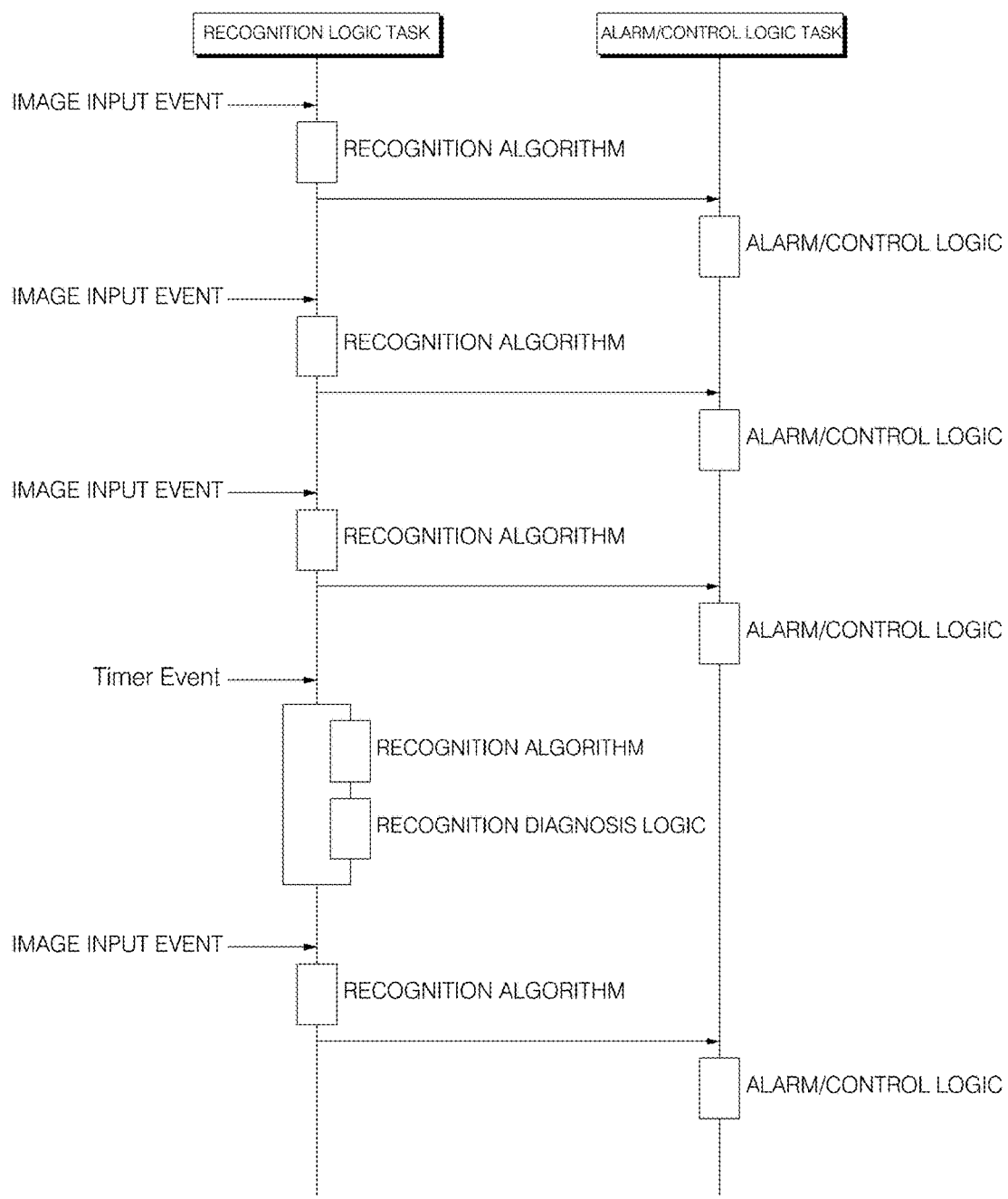
FIG. 4 is a block diagram illustrating a flow of a recognition logic task and a control logic task according to the recognition failure diagnosing software according to the present invention.

FIG. 4 is a block diagram illustrating a flow of the recognition logic task and the control logic task according to the recognition failure diagnosing software according to the present invention.

When the photographed image, into which the image frame 40 is input, is input into the recognition logic task by an image input event, the recognition algorithm calculates coordinates of a characteristic point in the image frame 50 and outputs coordinates of a recognized characteristic point.

The recognition diagnosis logic may compare the reference coordinates stored in the image frame 50 with the coordinates of the recognized characteristic point by using the image frame 50, which is set for determining whether the recognition algorithm is normally operated, as a source.

When the coordinates of the reference characteristic point, which have been calculated in advance by comparing the recognized characteristic points, are matched with the coordinates of the recognized characteristic point, it is determined that the recognition algorithm is normal, and when the coordinates of the reference characteristic point are not matched with the coordinates of the recognized characteristic point, it is determined that the recognition algorithm has a failure.

The recognition logic periodically reads the image frame in order to compare the reference coordinates with the coordinates of the recognized characteristic point. A timer event of the image input may be applied as a period of one second.

The alarm and control logic task may receive a result of the recognition algorithm and a result of the recognition diagnosis logic, and when it is determined that the recognition logic has the failure, an output of the result may be stopped and the failure may be recorded by the alarm and control logic.

Figure 5:
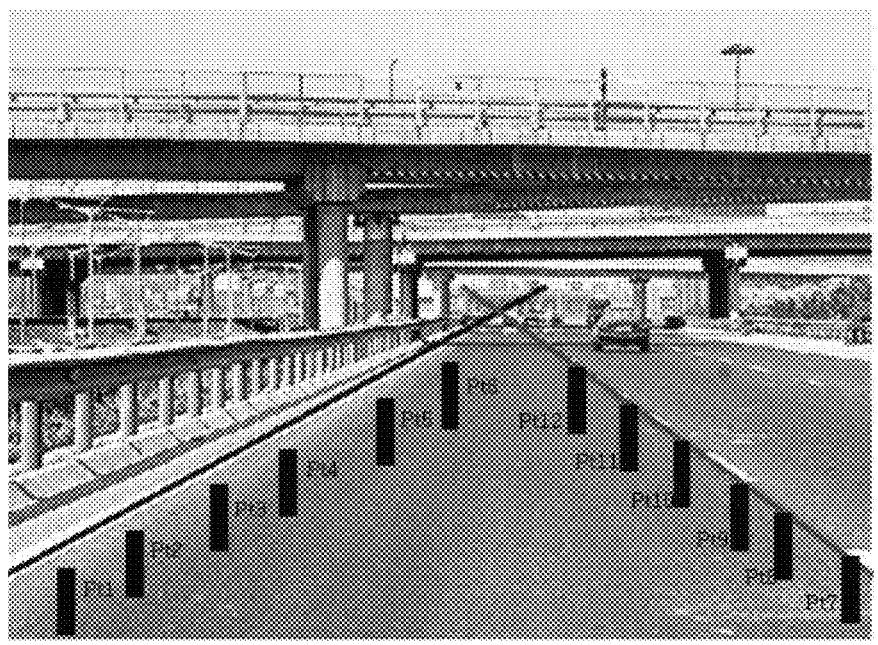
FIG. 5 is an image frame diagram illustrating a state, in which a recognition logic unit calculates coordinates of six characteristic points for one line of a lane.

FIG. 5 is an image frame diagram illustrating a state, in which the recognition logic unit 300 calculates coordinates of six characteristic points for one line of a lane. Referring to FIG. 5, when the load rate of the processor detected by the system load rate detecting unit 500 is less than a reference load rate, the normal operation determining unit 400 according to the exemplary embodiment determines whether coordinates of the six characteristic points are matched.

When the load rate of the processor detected by the system load rate detecting unit 500 is equal to or less than the reference load rate, the normal operation determining unit 400 considers all of the reference characteristic points included in the image frame 50, and in FIG. 3, the normal operation determining unit 400 considers the six reference characteristic points for one line of the lane recognized by the recognition logic unit 300.

In this case, the coordinates of the reference characteristic points stored in the image frame 50 also include six characteristic points of one line of the lane. The recognition logic unit 300 obtains a total of 12 recognized characteristic points in two lines of the lane, that is, every six recognized characteristic points per one line of the lane. The recognition logic unit 300 outputs coordinates of the recognized characteristic points Pt1 to Pt12, which are illustrated in FIG. 3, as X-axis coordinates and Y-axis coordinates.

The image frame compulsory input unit 200 applies the image frame 50 to the recognition logic unit 300 at a predetermined period instead of the image of the front side of the vehicle.

The normal operation determining unit 400 determines whether the coordinates of the reference characteristic point are matched with the coordinates of the recognized characteristic point during the compulsory input of the image frame 50.

While the exemplary embodiment of the present invention has been illustrated and described above, the present invention is not limited to the aforementioned specific exemplary embodiment, various modifications may be made by a person with ordinary skill in the art to which the present invention pertains without departing from the subject matters of the present invention that are claimed in the claims, and these modifications should not be appreciated individually from the technical spirit or prospect of the present invention.

What is claimed is:

1. An apparatus for diagnosing a recognition failure, which determines whether a target recognition by a camera sensor installed in a vehicle is normally operated, the apparatus comprising:
a non-volatile storage medium which stores
a reference image frame including a set target therein, and
reference coordinates of a reference characteristic point of the set target included in the reference image frame;
the camera sensor installed in the vehicle and which photographs a front side of the vehicle and outputs photographed image frames of the front side of the vehicle; and
circuitry including a microprocessor and configured to:
periodically read the reference image frame stored in the non-volatile storage medium and calculate coordinates of the reference characteristic point of the set target included in the read reference image frame while the circuitry calculates coordinates of a characteristic point in each photographed image frame received from the camera sensor and outputs the calculated coordinates of the characteristic point;
compare the periodically calculated coordinates of the reference characteristic point with the stored reference coordinates of the reference characteristic point;
determine that the circuitry is abnormally operated in recognizing the characteristic point in the each photographed image frame and output an alarm signal and a control signal when the stored reference coordinates do not match with the periodically calculated coordinates of the reference characteristic point,
wherein the circuitry is configured to recognize a lane in the each photographed image frame of the front side of the vehicle based on the calculated coordinates of the characteristic point in the each photographed image frame received from the camera sensor.

2. The apparatus of claim 1, wherein the reference image frame includes a number of the reference coordinates of one or more reference characteristic points, and
wherein the circuitry is further configured to:
recognize a number of calculated coordinates of the one or more reference characteristic points having the same number as the number of the reference coordinates of the one or more reference characteristic points included in the reference image frame; and
determine whether each calculated coordinates of the one or more reference characteristic points matches with each reference coordinates of the one or more reference characteristic points included in the reference image frame.

3. The apparatus of claim 1, wherein the circuitry is further configured to:
detect a load rate of the microprocessor when the circuitry calculates the coordinates of the characteristic point in the each photographed image frame,
wherein when a load rate of the microprocessor is equal to or larger than a reference load rate, the circuitry considers only a part of one or more reference characteristic points included in the reference image frame when the circuitry determines that the circuitry is abnormally operated in recognizing the characteristic point.

4. A method of diagnosing a recognition failure, which determines whether a target recognition by a camera sensor installed in a vehicle is normally operated, the method comprising:
photographing, by the camera sensor installed in the vehicle, a front side of the vehicle and outputting photographed image frames of the front side of the vehicle;
recognizing, by circuitry, a target in each photographed image frame of the front side of the vehicle and calculating coordinates of a characteristic point of the target in the each photographed image frame;

periodically reading, by the circuitry, a reference image frame stored in a non-volatile storage medium and including a set target therein, and reference coordinates of one or more reference characteristic points of the set target included in the reference image frame and calculating coordinates of the one or more reference characteristic points of the set target included in the read reference image frame while the circuitry recognizes the target in the each photographed image frame and calculates the coordinates of the characteristic point of the target in the each photographed image frame;

comparing, by the circuitry, the periodically calculated coordinates of the one or more reference characteristic points of the set target included in the read reference image frame with the read reference coordinates of the one or more reference characteristic points; and determining, by the circuitry, that the circuitry is abnormally operated in recognizing the target in the each photographed image frame and output an alarm signal and a control signal when the read reference coordinates of the one or more reference characteristic points do not match with the periodically calculated coordinates of the one or more reference characteristic points.

5. The method of claim 4, wherein the determining that the circuitry is abnormally operated in recognizing the target includes:

recognizing a number of the calculated coordinates of the one or more reference characteristic points having the same number as a number of the reference coordinates of the one or more reference characteristic points included in the reference image frame; and determining whether each calculated coordinates of the one or more reference characteristic points are matched with each reference coordinates of the one or more reference characteristic points included in the reference image frame.

6. The method of claim 4, further comprising:

detecting a load rate of a processor when the circuitry calculates the coordinates of the characteristic point of the target in the each photographed image frame, wherein when a load rate of the processor is equal to or larger than a reference load rate, only a part of the one or more reference characteristic points included in the reference image frame are considered by the circuitry during the determining that the circuitry is abnormally operated in recognizing the target.

* * * * *